(12) United States Patent
Bowen

(10) Patent No.: US 10,397,006 B2
(45) Date of Patent: Aug. 27, 2019

(54) NETWORK SECURITY WITH SURROGATE DIGITAL CERTIFICATES

(71) Applicant: Amazon Technologies, Inc., Seattle, WA (US)

(72) Inventor: Peter Bowen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 15/431,496

(22) Filed: Feb. 13, 2017

(65) Prior Publication Data
US 2018/0234256 A1    Aug. 16, 2018

(51) Int. Cl.
*H04L 9/32* (2006.01)
*H04L 29/06* (2006.01)

(52) U.S. Cl.
CPC ........ H04L 9/3265 (2013.01); H04L 63/0245 (2013.01); H04L 63/0428 (2013.01);
(Continued)

(58) Field of Classification Search
CPC . H04L 9/3265; H04L 3/0245; H04L 63/0428; H04L 63/064; H04L 63/0823; H04L 63/166; H04L 63/308
See application file for complete search history.

(56) References Cited

U.S. PATENT DOCUMENTS 9,009,461 B2 * 4/2015 Martini ............... H04L 63/0471
 713/153
9,021,575 B2 * 4/2015 Martini ................... H04L 63/04
 726/12

(Continued)

FOREIGN PATENT DOCUMENTS

WO    WO2010008539    1/2010

OTHER PUBLICATIONS

International Search Report and Written Opinion dated Apr. 24, 2018, in International Patent Application No. PCT/US2018/017368, filed Feb. 8, 2018.

(Continued)

*Primary Examiner* — Yonas A Bayou
(74) *Attorney, Agent, or Firm* — Davis Wright Tremaine LLP

(57) ABSTRACT

A computing device such as a network security device receives one or more digital certificates in a certificate chain and generates one or more surrogate digital certificates that form a surrogate certificate chain. A surrogate certificate may be generated using certificate information from a corresponding digital certificate of the received certificate chain. In some cases, the received certificate chain may have a trusted root certificate that is a trust anchor for the received certificate chain and the generated surrogate certificate chain may have a different trusted root certificate that is the trust anchor for the surrogate certificate chain. Cryptographic keys of the certificate chains may be used to establish cryptographically protected communication sessions. The computing device may monitor network traffic utilizing cryptographic keys included in the certificate chains to encrypt data. The encrypted data may be decrypted and inspected to determine whether sensitive information is transmitted in an improper manner.

20 Claims, 9 Drawing Sheets

(52) U.S. Cl.
CPC ........ *H04L 63/064* (2013.01); *H04L 63/0823* (2013.01); *H04L 63/166* (2013.01); *H04L 63/308* (2013.01)

(56) References Cited

U.S. PATENT DOCUMENTS

| | | | |
|---|---|---|---|
| 9,215,075 B1 * | 12/2015 | Poltorak | ................. H04L 63/04 |
| 9,467,424 B2 * | 10/2016 | Gluck | ................. H04L 63/0281 |
| 9,602,498 B2 * | 3/2017 | Wang | ................. H04L 63/0823 |
| 9,769,149 B1 * | 9/2017 | Brady | ................. H04L 63/0823 |
| 9,769,289 B2 * | 9/2017 | Tateishi | ................. H04L 69/169 |
| 9,787,477 B1 * | 10/2017 | Singal | ................. H04L 9/3268 |
| 9,961,103 B2 * | 5/2018 | Williams | ............ H04L 63/1441 |
| 10,021,088 B2 * | 7/2018 | Innes | ................. H04L 63/0823 |
| 10,084,888 B2 * | 9/2018 | Lee | ........................ H04L 67/42 |
| 10,091,005 B2 * | 10/2018 | Bell | .................... H04L 12/1859 |
| 2004/0015725 A1 | 1/2004 | Boneh et al. | |
| 2008/0126794 A1 * | 5/2008 | Wang | ................. H04L 63/0464 |
| | | | 713/151 |
| 2012/0246466 A1 | 9/2012 | Salvarani et al. | |

OTHER PUBLICATIONS

"Survival guides—TLS/SSL and SSL (X.509) Certificates," 82 pages, <http://www.zytrax.com/tech/survival/ssl.html> [retrieved on Feb. 13, 2017].

The OWASP Foundation, "How MITMproxy has been slaying SSL Dragons," The University of Otago, Apr. 14, 2012.

Dierks, T., and E. Rescorla, "The Transport Layer Security (TLS) Protocol Version 1.2," Request for Comments: 5246, Standards Track, Aug. 2008, 98 pages.

* cited by examiner

NETWORK SECURITY WITH SURROGATE DIGITAL CERTIFICATES

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Modern cryptographic algorithms provide high levels of data security. However, the use of encryption operations by users and entities within an organization may present challenges for an organization to monitor the security of a network and ensure that sensitive information (e.g., trade secrets, social security numbers, credit card numbers, private medical information) are not being transferred in an improper manner, whether inadvertently or maliciously.

BRIEF DESCRIPTION OF THE DRAWINGS

Various techniques will be described with reference to the drawings, in which.

DETAILED DESCRIPTION

Figure 1:
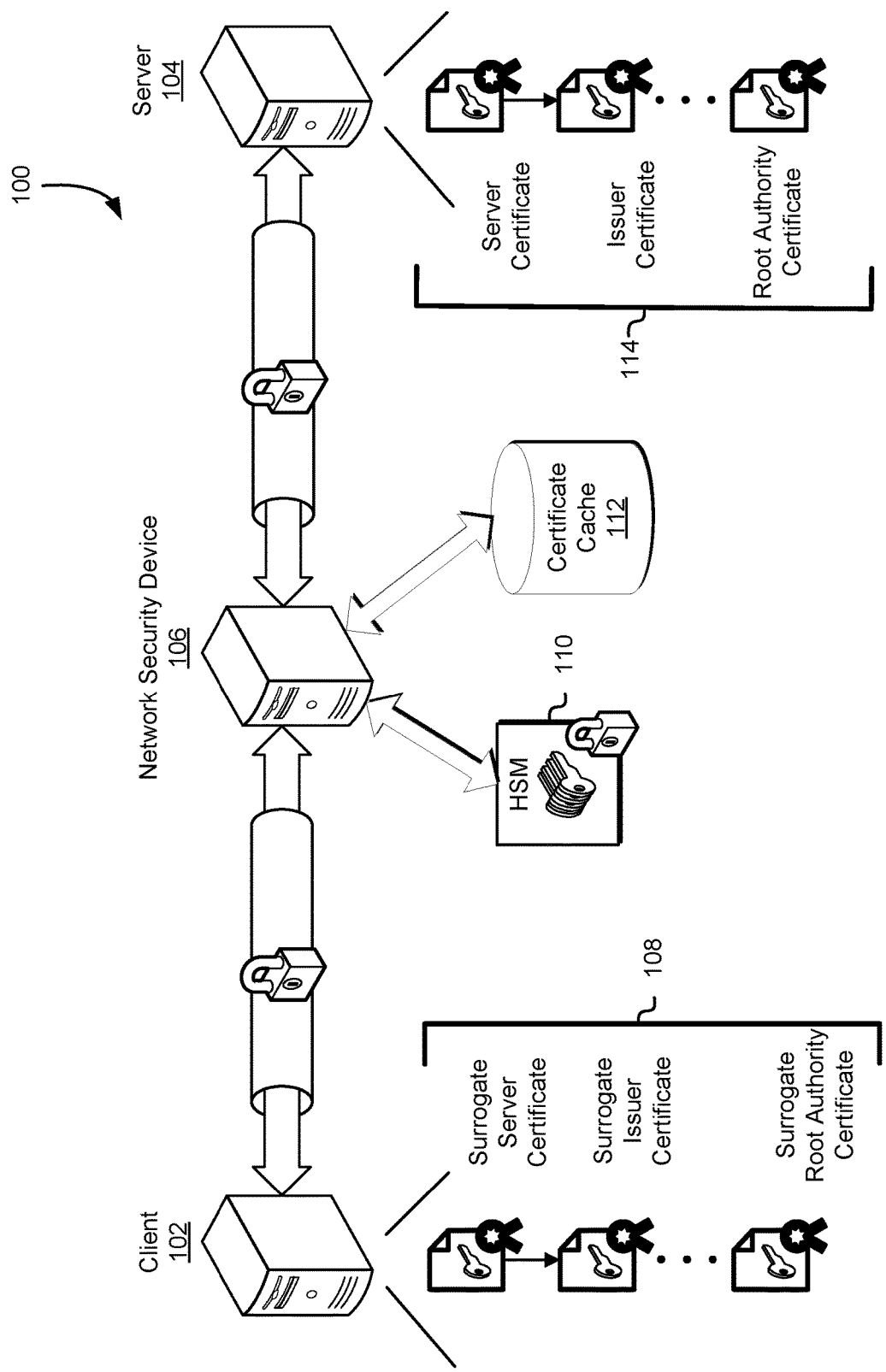
FIG. 1 shows an illustrative example of an environment in which various embodiments may be practiced.

This document describes techniques for preventing the unauthorized export of data and otherwise ensuring the security of information through the use of surrogate digital certificates. Systems described in this document may be used to generate, store, distribute, and use surrogate digital certificates which may be used by one or more network security devices to track network activity and detect whether sensitive information is being transmitted in an improper manner. Sensitive information may include an organization's trade secrets, private information, and the like. An example of sensitive information that should not be transmitted may include credit card numbers, social security numbers, and account passwords. A network security device may be used to monitor, track, and perform actions in response to the transmission of sensitive information across a network.

A network security device may be a computer device or module that is at the boundary of an organization's network (e.g., an intranet) and inspect data being received and/or transmitted across the network boundary. A client computer system within an organization's internal network may route network traffic outside of the internal network via one or more network security devices. For example, a client computer system that is inside an organization's intranet may attempt to communicate with a server outside of the network (e.g., an external computer system). Data from the client may be sent to a network security device and the network security device may inspect the data to ensure sensitive information is not being transmitted to outside of the intranet, and forward the data on to the server. An organization's internal network may have multiple network security devices for routing outbound traffic and those devices may be configured to communication with each other and/or utilize shared computing resources.

The network security device may be used to generate surrogate certificates and surrogate certificate chains. The network security device may access a hardware security module (HSM) and/or a certificate cache as part of generating one or more surrogate certificates. A surrogate certificate chain may include two or more digital certificates that form a chain of trust from an end-entity certificate (e.g., the surrogate server certificate) to a trusted root authority (e.g., the surrogate root authority certificate). The surrogate root authority certificate may be digitally signed by a surrogate root authority such as a corporate root authority. A system administrator of an organization may provision a client computer system and/or software on the client computer system so that the surrogate root authority certificate is trusted. For example, a web browser of the client computer device may be provisioned with a list of trusted root certificates that includes the surrogate root authority certificate. Thus, a valid chain of trust may be formed and verified from the surrogate server certificate to the surrogate root authority certificate. One or more certificates of the surrogate certificate chain may be derived in part from another certificate chain. Surrogate certificates may have various field information in common with a certificate from the other certificate chain, such as a subject name, an issuer name, an expiration, a key size, a key type, and more.

The client computer system and the network security device may communicate via a first cryptographically protected communication session such as a transport layer security (TLS) session. As part of a handshake process to establish the first cryptographically protected communication session, the client computer system may receive the surrogate certificate chain and use a subject public key included in the surrogate server certificate to establish the cryptographically protected communication session. The network security device and the server may communicate via a second cryptographically protected communication session such that the network security device receives the certificate chain and use a subject public key included in the server certificate to establish the second cryptographically protected communication session.

The network security device may be used to track network traffic. The network security device may receive encrypted data sent by a client computer system with an intended recipient as a server and may have access to a surrogate private key that is the corresponding private key to the public key in the surrogate server certificate, the public key being used to encrypt the data. The network security device may obtain the unencrypted data and determine whether the data contains sensitive information. For example, the data may include a social security number (e.g., the social security number of a customer) and may be considered sensitive information. Upon detecting that there is sensitive information that is being transmitted in the data, the data may be modified so as to obfuscate or remove the sensitive information. The modified data may be encrypted using a public key for transmission to the server using the server certificate to obtain a public key to be used for encrypting the modified data.

Certificates and surrogate certificates may be encapsulated in various types of data packets as part of being transmitted across one or more networks. The network security device may receive a first data packet including a data packet header that includes various fields, some of which may indicate the size of the data packet and/or data payload (e.g., the Internet Header Length (IHL), Total Length, and/or Checksum fields of an Internet Protocol Version 4 (IPv4) packet) and a payload that includes at least part of a certificate chain. The network security device may generate a derived data packet by cloning the received data packet (e.g., using a memory copy operation) and replacing the payload (e.g., IP data section of an IPv4 packet) with a surrogate certificate or surrogate certificate chain having the same size as the certificate or certificate chain that was received. In this way, the header information of the derived data packet may have the same data header information as the received data packet. In some cases, the surrogate certificate chain may be smaller in size than the received certificate and the derived data packet may include a padding structure such that the payload (e.g., data section) of the received data packet and the derived data packet are of the same size. The data packet may be in accordance with various protocols, such as Internet Protocol Version 4 (IPv4), Internet Protocol Version 6 (IPv6), and the Hypertext Transfer Protocol (HTTP). More generally, a first data packet having header data and/or metadata may be received by a data networking device in connection with the transmission of a certificate and/or certificate chain. A second data packet having the same header and/or metadata may be transmitted by the data networking device in connection with a surrogate certificate or surrogate certificate chain derived at least in part from the certificate chain.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, a client computer system 102 and a server 104 may communicate (e.g., via a network) using a network security device 106. The network security device 106 may be used as part of establishing one or more cryptographically protected communication sessions, such as between the client 102 and the network security device 106 and between the server 104 and the network security device 106.

The client computer system 102 may be a computer system that is implemented using hardware, software, or a combination of both. The client computer system 102 may be configured to communicate via various types of network, including an intranet, the Internet, a cellular network, a local area network, a satellite network or any other such network and/or combination thereof. A client computer system 102 may be hosted within the network environment of an organization which may administer a set of policies—for example, a network administrator of the organization may provision the client computer system 102 with a set of trusted root certificates. A trusted root certificate may be used to attest to the authenticity of data such as subordinate authorities through the use of cryptography, such as by generating a digital signature or a message authentication code (MAC). As an example, a trusted root certificate may be issued by a certificate authority (e.g., Global Sign, DigiCert, and Entrust) or may also be an private certificate authority issued by an organization to its own devices. In some embodiments, a client computer system 102 resides within an intranet of an organization and traffic between the client computer system 102 and an external party (e.g., the server 104 shown in FIG. 1) may be routed through a network security device 106 at the edge of the intranet. The client computer system may have access to a surrogate certificate chain 108, which may have been obtained as part of a communication with another entity (e.g., the server 104 of FIG. 1).

The server 104 may be a computer system that is implemented using hardware, software, or a combination thereof. In some embodiments, the server 104 may be a computer that is located outside of an organization's intranet and computing devices from within the intranet (e.g., the client computer system 102) may connect to the server 104 via an external network such as the Internet. The server may be any suitable computing device, and may have access to computing resources which may be made accessible to the client 102. In some embodiments, the client computer system 102 may attempt to establish a cryptographically protected communication session with the server 104. In some cases, the client computer system 102 may be provisioned with malicious code (as a result of malware, a Trojan Horse virus, or more generally, a computer security exploit) that causes the client 102 to attempt to exfiltrate sensitive information to the server 104.

The network security device 106 may be a computer device or module that is at the boundary of an organization's network (e.g., an intranet) and inspect data being received and/or transmitted across the network boundary. The network security device may be implemented using hardware, software, or a combination thereof. In some embodiments, a client computer system 102 within an organization's internal network routes network traffic outside of the internal network through one or more network security devices. For example, a client computer system 102 that is inside an organization's intranet may attempt to communicate with a server 104 outside of the network (e.g., an external computer system). Data from the client 102 may be sent to a network security device 106 and the network security device may inspect the data to ensure sensitive information is not being transmitted to outside of the intranet, and forward the data on to the server 104. An organization's internal network may have multiple network security devices for routing outbound traffic, and those devices may be configured to communication with each other and/or utilize shared computing resources. The network security device may be implemented as a firewall device, a router device, a switch device, a hub device, and various other types of computing devices. A network security device may be implemented as a module in the devices described above and may be implemented as computer executable code in the various computing devices described above.

Additionally, the network security device 106 may be used to generate surrogate certificates. The network security device may access a hardware security module 110 (HSM) and/or a certificate cache 112 as part of generating a surrogate certificate. A hardware security module 110 may be a cryptographic module that is used to store cryptographic keys. In some embodiments, the network security device 106 may have access to a cryptography service that performs various cryptographic operations (such as generating digital certificates) which may be backed by one or more HSMs. In some embodiments, the network security device 106 may utilize a HSM 110 and/or a cryptography service to generate digital certificates. In some embodiments, the network security device may, for example, using a cryptography service, generate a digital certificate that is signed by a surrogate root authority. Continuing with the example, an organization may have a corporate root authority such that a private key of an asymmetric key pair is used to digitally sign a corporate root authority certificate, and the corporate root authority certificate and the client computer system 102 is provisioned (e.g., by a system administrator) to include the corporate root authority certificate in a list of trusted root certificates. A corporate root authority certificate may be a surrogate root authority certificate.

In some embodiments, the network security device 106 may include and/or have access to a certificate cache 112. When a surrogate certificate is generated, the surrogate certificate may be stored in the certificate cache 112 and a mapping of the surrogate certificate to a certificate may be stored in the certificate cache 112. The certificate cache may be implemented using volatile storage (e.g., random access memory) or persistent storage (e.g., hard disk drive), may be stored using structured storage (e.g., a database or database system), or unstructured storage (e.g., as a bitstream in a data file). In a certificate cache 112, digital certificates may be individual cached or may include additional associations. For example, links in a certificate chain may also be stored in the certificate cache such that a surrogate certificate may have an associative link to an issuer certificate (e.g., in FIG. 1, an associative link from the surrogate server certificate to the surrogate issuer certificate).

The surrogate certificate chain 108 may include two or more digital certificates that form a chain of trust from an end-entity certificate (e.g., the surrogate server certificate) to a trusted root authority (e.g., the surrogate root authority certificate). The surrogate root authority certificate may be digitally signed by a surrogate root authority such as a corporate root authority and the surrogate root certificate may act as the trust anchor of the surrogate certificate chain 108. A system administrator of an organization may provision the client computer system 102 and/or software on the client computer system so that the surrogate root authority certificate is trusted. For example, a web browser of the client computer device 102 may be provisioned with a list of trusted root certificates that includes the surrogate root authority certificate. Thus, a valid chain of trust may be formed and verified from the surrogate server certificate to the surrogate root authority certificate. In some embodiments, the surrogate certificate chain may include two digital certificates (e.g., a surrogate server certificate that is digitally signed by the surrogate root authority). In other embodiments, three or more digital certificates may be included in the chain. A valid root of trust may exist where the validity of a digital certificate is cryptographically verifiable using a trusted root certificate. In FIG. 1, a valid chain of trust exists from the surrogate server certificate to the surrogate root authority certificate, and the chain of trust is cryptographically verifiable.

In some embodiments, one or more certificates of the surrogate certificate chain 108 may be derived in part from a certificate chain 114. The certificate chain 114 may be a certificate chain having a trusted root certificate and an end-entity certificate that includes an asymmetric public key of the server 104. The certificate chain 114 may be provided as part of a TLS handshake process. In some embodiments, the surrogate server certificate and the server certificate have information shared in common, such as a subject name, an issuer name, an expiration, a key size, a key type, and more. In some embodiments, the digital certificates shown in FIG. 1 are X.509 v3 certificates in accordance with RFC 5280 which is hereby incorporated to this document by reference.

The client computer system 102 and the network security device 106 may communicate via a first cryptographically protected communication session such as a transport layer security (TLS) session. As part of a handshake process to establish the first cryptographically protected communication session, the client computer system 102 may receive the surrogate certificate chain 108 and use a subject public key included in the surrogate server certificate to establish the cryptographically protected communication session. The network security device 106 and the server 104 may communicate via a second cryptographically protected communication session such that the network security device 106 receives the certificate chain 114 and use a subject public key included in the server certificate to establish the second cryptographically protected communication session.

Figure 2:
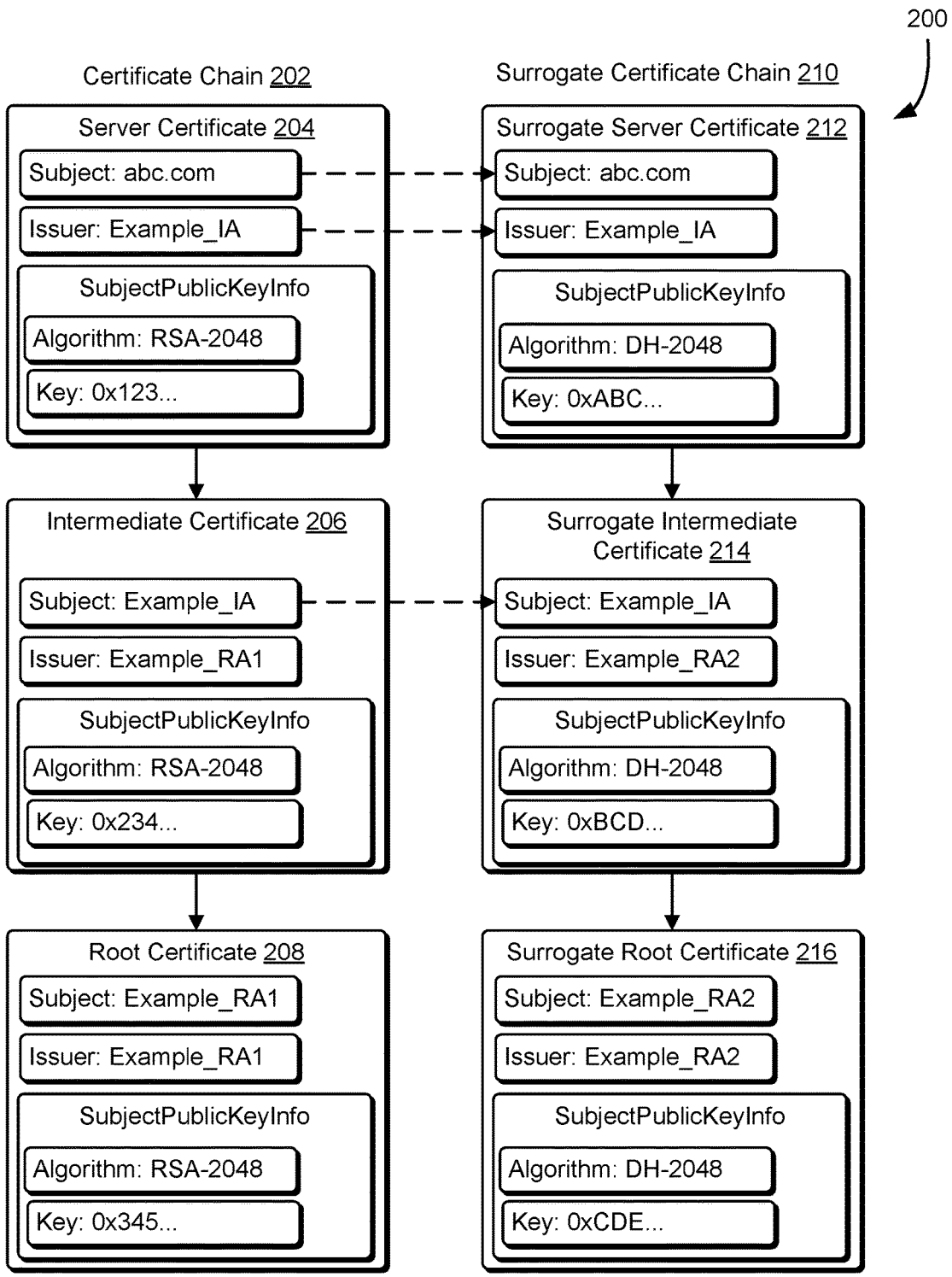
FIG. 2 shows an illustrative example of a surrogate certificate chain.

FIG. 2 shows a diagram 200 of a certificate chain 202 and a surrogate certificate chain 210. One or more digital certificates of the surrogate certificate chain may be derived in part from corresponding digital certificates in the certificate chain. The certificate chain 202 shown in FIG. 2 includes three certificates—the server certificate 204, an intermediate certificate 206, and a root certificate 208. A certificate may include various fields such as the subject of the certificate, the issuer of the certificate, and subject public key information that may further include a subject public key and information regarding the subject public key such as the key type and the key size. The certificates may be X.509 v3 certificates in accordance with RFC 5280 which is hereby incorporated to this document by reference.

The server certificate 204 may be an end-entity certificate. An end-entity certificate may refer to a certificate that includes a public key that has a corresponding private key which is used as part of a cryptographically protected communication. For example, in FIG. 1, the server certificate, which may include the public key of the server 104, may have a corresponding private key that the server 104 uses as part of a TLS handshake process to establish a TLS session. The Subject field of the certificate may be an identifier that refers to the entity associated with the certificate. For example, in the server certificate 204, the subject "Server" may refer to a server such as the server described above in connection with FIG. 1. The Issuer field of the certificate may refer to the entity that digitally signed the certificate. In some embodiments, the issuer identified in the Issuer field may be an intermediate authority or may be a root authority for a certificate chain. For example, in the server certificate 204, the issuer "Example_IA" may refer to an intermediate authority that has digitally signed the server certificate 202. A certificate may further include information regarding the subject's public key information. The SubjectPublicKeyInfo field may include two subfields—a Key field which includes a bitstream of the cryptographic public key of the subject, and an Algorithm field which identifies the public key algorithm of the subject public key. For example, in server certificate 204, the algorithm "RSA-2048" may refer to the subject public key being a 2048-bit RSA public key, and the key may be a 2048 bit stream. The public key of the server certificate 204 may have a different value from the public key of other certificates shown in FIG. 2—note that the public key of the server certificate 204 (which, for illustrative purposes, begins with a hexadecimal value of 0x123) has a different value from the public key of the surrogate server certificate 212 (which, also for illustrative purposes, has a different hexadecimal value beginning with 0xABC).

The intermediate certificate 206 may be a certificate that is issued, either directly or indirectly, by a trusted certificate authority. The intermediate authority associated with the intermediate certificate 206 may have access to a private key corresponding to the public key of the intermediate certificate (e.g., the public key 0x234 . . . ). The intermediate authority's private key may be used to digitally sign the server certificate 204, and the intermediate certificate 206 may be used to cryptographically verify the digital signature by performing a signature verification using the subject public key of the intermediate certificate 206. In some embodiments, the Subject field of the intermediate certificate 206 and the Issuer field of the server certificate 204 match (i.e., the issuer field of a first certificate matches the subject field of a second certificate where the second certificate is associated with the entity that digitally signed the first certificate).

The root certificate 208 may be a certificate that is self-issued by the certificate authority associated with the root certificate. For example, the Subject field and the Issuer field of the root certificate may refer to the same entity. In some embodiments, additional information is included in the certificate to indicate that a certificate is a root certificate. For example, a root certificate 208 in accordance with the X.509 v3 standard may include a basicConstraints field that further includes a cA field being TRUE. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provision by the organization but not necessarily trusted by device that have not been provisioned by the organization. A private key associated with the root authority identified in the root certificate 208 may be used to digitally sign the intermediate certificate 206, and the subject public key included in the root certificate 208 may be used to cryptographically verify the authenticity of the digital signature generated over the intermediate certificate.

A valid chain of trust may exist from the server certificate 204 to the root certificate 208 and the validity of the chain may be cryptographically verified. A verification of the chain of trust may include obtaining an end-entity certificate (e.g., the server certificate 204) and verifying the digital signature of the end-entity certificate using the public key of the issuer of the end-entity certificate (e.g., the intermediate certificate 206). In turn, the issuer certificate (e.g., the intermediate certificate 206) may be obtained and the digital signature of the issuer certificate may be verified in the same manner as just described. This process may be repeated until a certificate signed by a root authority (e.g., the root certificate 208) is obtained. The root authority certificate may act as the trust anchor for the certificate chain. The digital signature of the root certificate may be verified using the public key contained within the root certificate, and a verification may be performed to check that the root certificate is included in a list of trusted root certificates (e.g., a list of trusted certificates that is provisioned at least in part by a system administrator).

It should be noted that while one intermediate certificate is shown in the certificate chain 202 in connection with FIG. 2, that in some embodiments there may be more or less intermediate authorities. For example, in some embodiments, a server certificate may directly chain to a root certificate (e.g., where an end-entity certificate is digitally signed by a root authority). As a second example, an end-entity certificate may be digitally signed by a first intermediate authority, the certificate of the first intermediate authority may be digitally signed by a second intermediate authority, and the certificate of the second intermediate authority may be digitally signed by a root authority. In some embodiments, a certificate chain may include even more intermediate certificates.

One or more certificates of the surrogate certificate chain 210 may be derived at least in part from a corresponding certificate in the certificate chain 202. One or more certificates of a surrogate certificate chain 210 may be generated by a network security device such as those described in embodiments in connection with FIG. 1. As an example, a surrogate server certificate 212 may be generated based at least in part on the values of one or more fields of another certificate such as the server certificate 204. The surrogate server certificate 212 shown in FIG. 2 may be generated by obtaining the Subject and Issuer fields of the server certificate 204. In some embodiments, the subject information, issuer information, or other certificate information of a surrogate certificate may associated with respective information of a corresponding certificate. Certificate information of a surrogate digital certificate may be associated to certificate information of a corresponding digital certificate may be associated in various ways—for example, an association may refer to certificate information for one or more fields of a surrogate certificate being identical to the certification information included in the corresponding certificate. In other cases, the association may include a transformation of the data, for example, in some cases, the subject information of a certificate may include a mapping of a human-readable field from one language to another language. In some embodiments, additional fields of a surrogate certificate such as the certificate expiration may be derived. In some embodiments, the subject public key of the surrogate server certificate 212 and the server certificate 204 may be the same size. For example, in FIG. 2, the surrogate server certificate 212 may have a 2048-bit key whose size is selected to match the size of the server certificate 204 public key size. Note that in some embodiments, the key size of the surrogate certificate may be the same as the certificate it is derived from and the key type may be different. For example, the surrogate server certificate 212 uses a first public key algorithm such as Diffie-Hellman Key Exchange algorithm and the server certificate uses a second public key algorithm such as RSA algorithm. The surrogate server certificate 212 may be digitally signed by a private key of an intermediate authority that is associated with the surrogate intermediate certificate 214.

The surrogate intermediate certificate 214 may be derived in part from the intermediate certificate. A surrogate intermediate certificate may be associated with an intermediate authority that may be used to issue certificates such as an end-entity certificate (e.g., the surrogate server certificate 212 shown in FIG. 2). A surrogate intermediate authority may map to an intermediate certificate authority of the certificate chain 202. The Subject field of the surrogate intermediate certificate 214 may be derived from the Subject field of a corresponding intermediate certificate 206. In some embodiments, the Issuer field of the surrogate intermediate certificate may also be derived from the corresponding intermediate certificate. The surrogate intermediate certificate 214 may be digitally signed by a private key of another intermediate authority or by a root authority. For example, in FIG. 2, the surrogate intermediate certificate 214 may be digitally signed by the root authority associated with the surrogate root certificate 216.

In some embodiments, a surrogate root certificate 216 may be the root certificate of a surrogate certificate chain 210. In some embodiments, the root certificate of the certificate chain (e.g., the root certificate 208 shown in FIG. 2) and the root certificate of the surrogate certificate chain (e.g., the surrogate root certificate 216 shown in FIG. 2) may exist such that the surrogate root certificate 216 were independently generated such that at least the Subject field and the Issuer field of the surrogate root certificate was not derived from the root certificate 208. In some embodiments, a system administrator may provision a computer system to include one or more root certificates issued by an organization's internal certificate authority to a list of trusted root certificates. The surrogate root certificate 216 may be issued by an organization's internal certificate authority. In some embodiments, the surrogate root certificate 216 and the root certificate 208 may be the same certificate.

As shown in FIG. 2, the certificate chain 202 and the surrogate certificate chain 210 may both have valid chains of trust that are verified against different root authorities. In some embodiments, a computer system 208 that receives the certificate chains may have a list of trusted root certificates that includes both the root certificate 208 and the surrogate root certificate 216. In some embodiments, one or more certificates of the certificate chain 202 may have the same size (e.g., in bytes) as a corresponding certificate in the surrogate certificate chain 210. In some embodiments, the size of the certificate chain 202 and the size of the surrogate certificate chain 210 are equal. In some embodiments, the size of each certificate in the surrogate certificate chain 210 is equal to the size of a corresponding certificate in the certificate chain 202 (e.g., the size of the surrogate server certificate 212 is the same as the size of the server certificate 204, and so on for all certificates in the respective chains).

Figure 3:
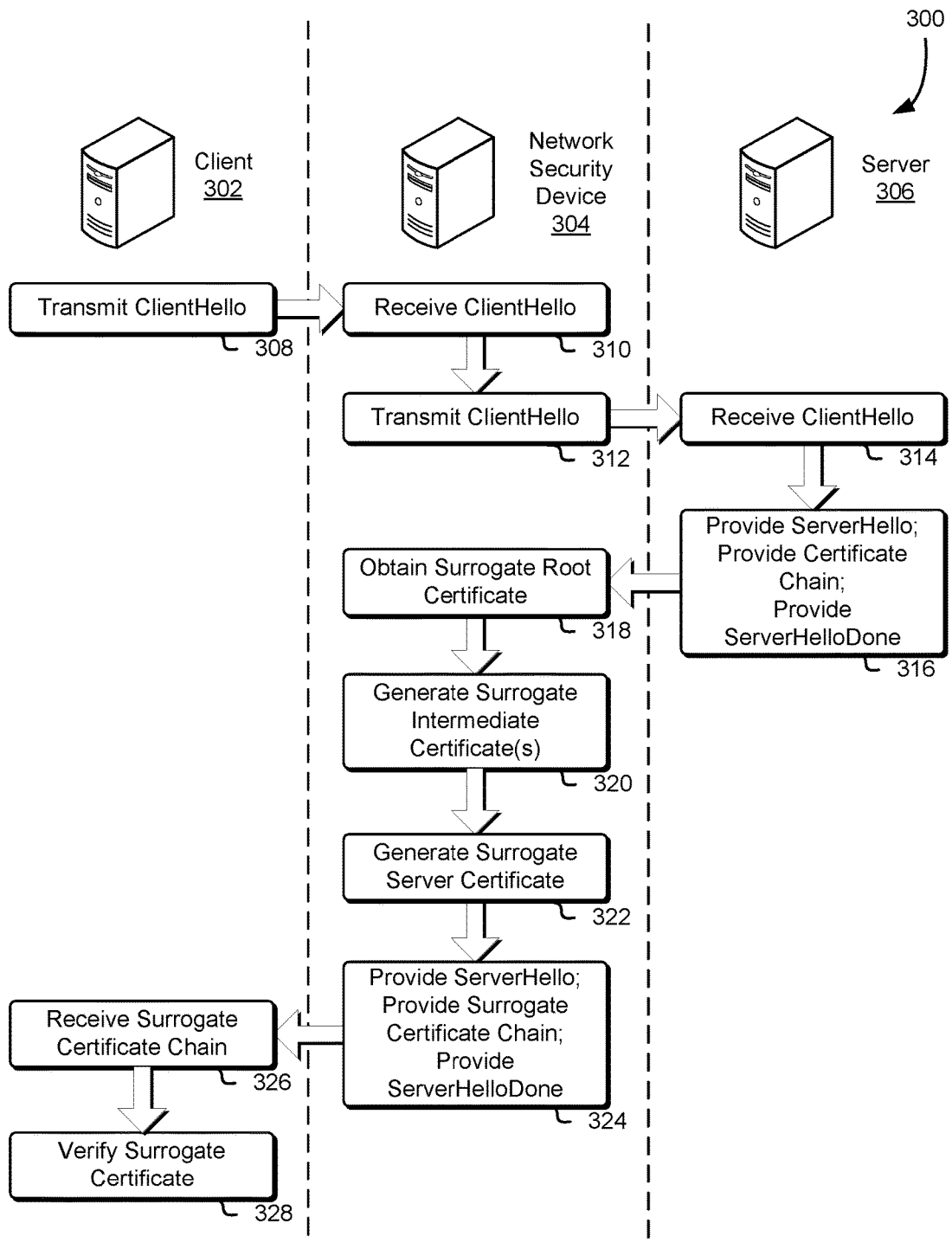
FIG. 3 shows an illustrative example of a handshake process.

FIG. 3 shows a diagram 300 in which a client 302, network security device 304, and server 306 perform a set of operations in connection with establishing cryptographically protected communication sessions. The operations may, for example, be performed in connection with a TLS handshake.

The client computer system 302 may be a computer system in accordance with client computer systems described above in connection with FIG. 1. The client computer system 302 may be a computing device within an organization's intranet that may have access to sensitive information. Sensitive information may refer to information that should not be transmitted outside of the company's intranet. For example, sensitive information may include an organization's trade secrets, social security numbers of employees or customers, credit card numbers, and more. The network security device 304 may be a computing device in accordance with the network security device described above in connection with FIG. 1. In some embodiments, the client computer system 302 connects with computing devices outside of an organization's intranet via one or more network security devices. The network security device 304 may sit at the boundary between the company intranet and external networks (e.g., the Internet) and network traffic from external networks to the client 302 may be routed via one or more network security devices. The network boundary may, in some embodiments, include computing systems within an intranet and outside of the intranet or computing systems entirely within a subsection of an intranet. A network boundary may exist based on physical location of devices, such as those within a data center or physical office location. Network boundaries may also exist based on virtual and/or logical information, such as between a virtual machine instance and another computing system (e.g., another virtual machine instance running on the same host machine). More generally, a network boundary may exist in various logical, virtual, and/or physical locations between the source and destination of network traffic. In some embodiments, the network boundary may exist at the destination of the network traffic, such as in cases where the destination is a computing system that has been quarantined or blacklisted. The server 306 may be a server in accordance with servers described above in connection with FIG. 1. The server 304 may be a computing system outside of an organization's intranet that the client 302 attempts to establish a TLS session with.

As part of a TLS handshake protocol, a client computer system 302 intranet may transmit 308 a first TLS ClientHello with an intended recipient being the server 306. In some embodiments, the first TLS ClientHello may be routed to the server 306 via the network security device 304. The network security device may receive 310 the first TLS ClientHello and in response to receiving the first TLS ClientHello transmit 312 a second TLS ClientHello to the server 306. In some embodiments, the first TLS ClientHello may include an ordered list of supported cryptographic algorithms (e.g., from most to least preferred) and the second TLS ClientHello may include the same ordered list. However, in other embodiments, the network security device 304 may transmit the second ClientHello with a different list and may include additional cryptographic algorithms (e.g., cryptographic algorithms supported by the network security device 304 but not supported by the client computer system 302). The server 306 may receive 314 the second ClientHello.

In response to receiving the second ClientHello, the server 306 may provide 316 a corresponding ServerHello, a certificate chain, and a ServerHelloDone. The certificate chain may include an end-entity certificate that is associated with the server 306 and includes a subject public key whose corresponding private key is accessible to the server 306. The certificate chain may be a certificate chain such as those describe above in connection with FIG. 2, and may have a chain of trust that is rooted in a trusted certificate authority. The authenticity and integrity of the certificate chain may be cryptographically verifiable by a recipient of the certificate chain. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. The network security device 304 may receive the ServerHello, the certificate chain, and the ServerHelloDone and may subsequently verify that the certificate chain is valid and complete the TLS handshake with the server 306.

The network security device 304 may generate a surrogate certificate chain. As part of generating the surrogate certificate chain, the network security device 304 may obtain 318 a surrogate root certificate, which may be a digital certificate associated with a root authority trusted by the client computer system 302. The network security device 304 may have access to the private key corresponding to the public key included in the surrogate root certificate, or may have access to a cryptography service that is operable to perform cryptographic operations that utilize the private key (e.g., issuing digital certificates). The network security device 304 may generate 320 one or more surrogate intermediate certificates. Using the certificate chain shown in FIG. 2 as an example, a surrogate intermediate certificate may be generated having the same Subject field as a corresponding intermediate certificate of the certificate chain, and an Issuer field that indicates the intermediate certificate is issued and digitally signed by the surrogate root authority. Returning to FIG. 3, in some embodiments, the key algorithm of a surrogate intermediate certificate may be derived from an intermediate certificate.

Additionally, in some embodiments, a surrogate intermediate certificate may be structured so as to have the same size as the corresponding intermediate certificate. For example, the key size of the surrogate intermediate certificate may be selected to be the same size as that of the corresponding intermediate certificate. In some cases, a surrogate certificate (e.g., surrogate intermediate certificate) may include a padding structure so as to match the size of a corresponding certificate. A padding structure may, for example, be a stream of random or deterministic bytes of a predetermined size. A padding structure may be included as part of an Extensions field of a certificate, such as a X.509 v3 digital certificate. As a second example, a padding structure may be included in an optional field such as an IssuerUniqueIdentifier or SubjectUniqueIdentifier field of a X.509 v3 digital certificate. In some embodiments, the size of a surrogate certificate may be matched to the size of a certificate by generating a longer or shorter identifier (e.g., Serial Number field of a X.509 v3 digital certificate) so as to make the certificate sizes match. In some embodiments, a surrogate certificate may derive at least some certificate information from a corresponding certificate and omit other information. For example, in some cases, a system generating surrogate certificates may determine that the size of a surrogate certificate is too large (e.g., larger than the corresponding digital certificate which a surrogate certificate is to be equal in size with) if all derived fields of the corresponding digital certificate are included in the surrogate certificate. As a result, the system may omit and/or truncate the contents of one or more optional fields when generating the surrogate certificate (i.e., the omitted fields are not included in the surrogate certificate). Fields that may be omitted and/or truncated include alternative names and extensions related to revocation of certificates. In some examples, a certificate may include multiple fields related to revoking certificates, and a surrogate certificate derived from that certificate may omit one or more of the multiple fields related to revoking certificates. In some embodiments, the fields being omitted and/or truncated may be determined based at least in part on the capabilities of the computing entity to receive the surrogate certificate (e.g., extensions which the computing entity does not support may be omitted and/or truncated). In some embodiments, multiple intermediate certificates may be chained together where a first intermediate authority is the issuer for the digital certificate of a second intermediate authority. In some embodiments, surrogate certificates may be cached (e.g., in a certificate cache discussed above in connection with FIG. 1) and the network security device may first check whether to surrogate certificate exists in the cache. If the surrogate certificate does not exist, one may be generated as discussed above, but if one is found in the cache, the cached surrogate certificate may instead be obtained from the certificate cache.

A surrogate server certificate may be generated 322. The network security device 304 may have access to a private key corresponding to the subject public key contained in the surrogate server certificate. The surrogate server certificate may be digitally signed by a surrogate intermediate authority or a surrogate root authority. The surrogate server certificate may be an end-entity certificate that may be used by the client 302 and network security device 304 as part of a key exchange process. A surrogate certificate chain may be constructed using the surrogate certificates discussed above. The network security device 304 may, in response to the first TLS ClientHello from the client 302, provide 324 a ServerHello, a surrogate certificate chain, and a ServerHelloDone to the client 302.

The client 302 may receive 326 the ServerHello, surrogate certificate chain, and ServerHelloDone. Upon receiving the surrogate certificate chain, the client 306 may verify 328 the chain of trust from the surrogate server certificate to the surrogate root certificate. Upon verifying that the chain of trust is valid and determining that the surrogate server certificate is authentic, the client 302 and network security device 304 may complete a TLS handshake and transmit data in accordance to a TLS record protocol.

Figure 4:
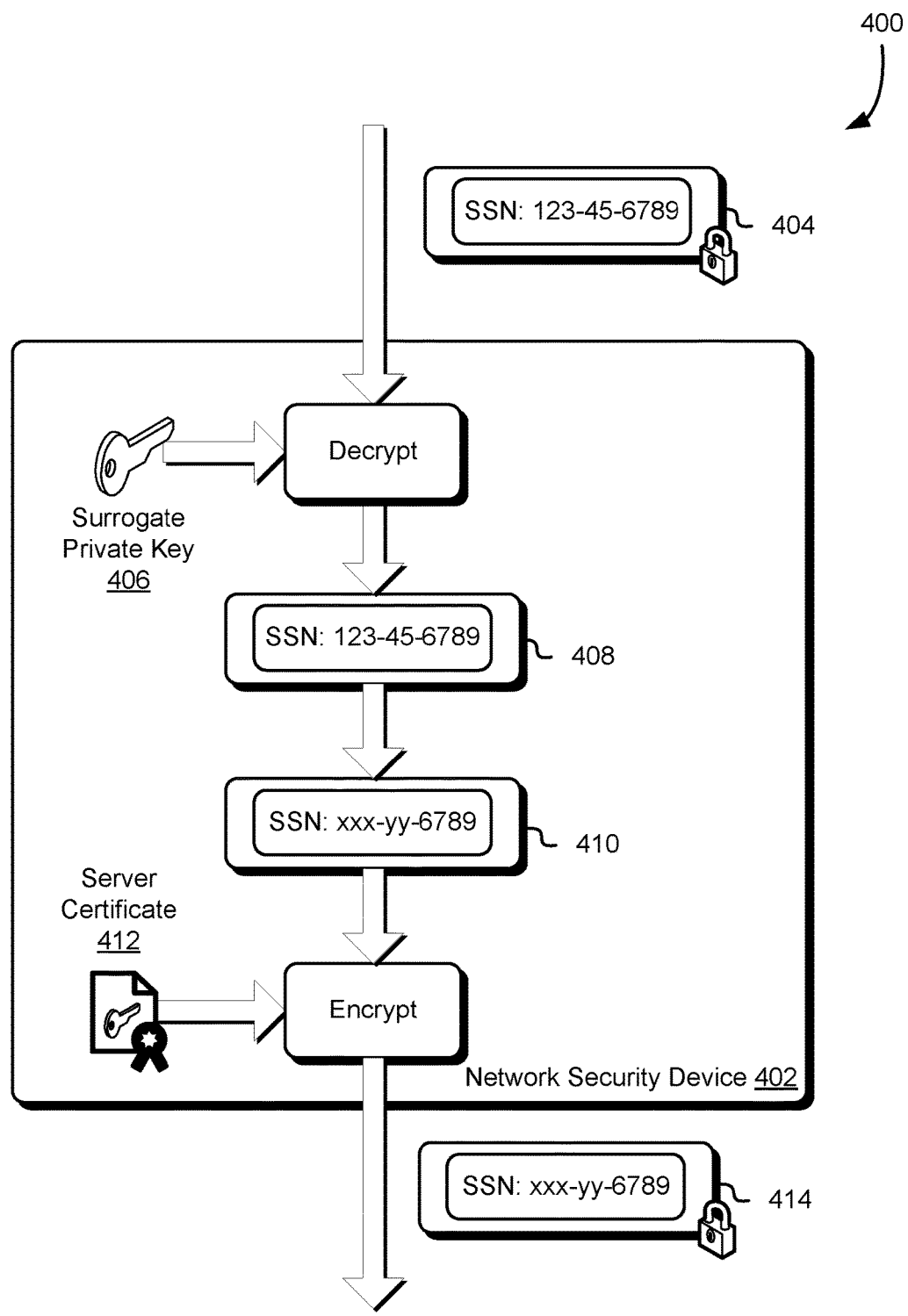
FIG. 4 shows an illustrative example of a network security device monitoring network traffic.

FIG. 4 shows a diagram 400 of a network security device monitoring network traffic. The network security device 402 may be a network security device described above in connection with FIGS. 1-3. The network security device 402 may receive encrypted data 404. The encrypted data 404 may be sent by a client computer system with an intended recipient as a server (e.g., the client and server discussed in connection with FIG. 1). The encrypted data may be received in accordance with a version of TLS (e.g., TLS version 1.2 as defined in RFC 5246 dated August 2008 which is hereby incorporated by reference). The network security device 402 may receive the encrypted data 404 from the client computer system, where the client computer system cryptographically encrypted the data using the public key included in a surrogate server certificate such as those described above in connection with FIGS. 1-3. The network security device 402 may have access to a surrogate private key 406 that is the corresponding private key to the public key in the surrogate server certificate, the public key being used to encrypt the data. The network security device 402 may decrypt the encrypted data 404 using the surrogate private key 406 and obtain the unencrypted data 408.

The network security device 402 may obtain the unencrypted data 408 and determine whether the data contains sensitive information. For example, in FIG. 4, the data may include a social security number (e.g., the social security number of a customer) and may be considered sensitive information. Upon detecting that there is sensitive information that is being transmitted in the data, the data may be modified. In some embodiments, the sensitive information may be entirely removed (e.g., in the case of a password or personal identification number (PIN)). In other cases, the sensitive information may be modified, such as shown in FIG. 4, where the network security device may be configured to obfuscate part of the information such that the obfuscated information is in an acceptable form. In the case of social security numbers, it may be acceptable to transmit the last four digits of a social security number but not the entire social security number. The modified data 410 may be encrypted using a public key for transmission to a recipient. For example, to transmit the modified data to a server (e.g., the server described in connection with FIG. 1), the network security device 402 may obtain the server certificate 412 and encrypt the modified data using the public key included in the server certificate. The encrypted modified data 414 may be transmitted to the server, which may decrypt the modified data using the private key corresponding to the public key in the server certificate 412.

Note that various alternative embodiments may exist. For example, in some embodiments, a network security device and a client computer system may, as part of a first TLS handshake, agree upon the use of a first symmetric key to transmit data. Likewise, the network security device and a server may, as part of a second TLS handshake, agree upon the use of a second symmetric key for transmitting data. The network security device may receive encrypted data from the client computer system, decrypt the encrypted data using the first symmetric key, detect the existence of sensitive information in the data, modify the data accordingly, encrypt the modified data using the second symmetric key, and transmit the encrypted modified data to the server, and the server, which may also have access to the second symmetric key, may obtain the decrypted modified data.

Figure 5:
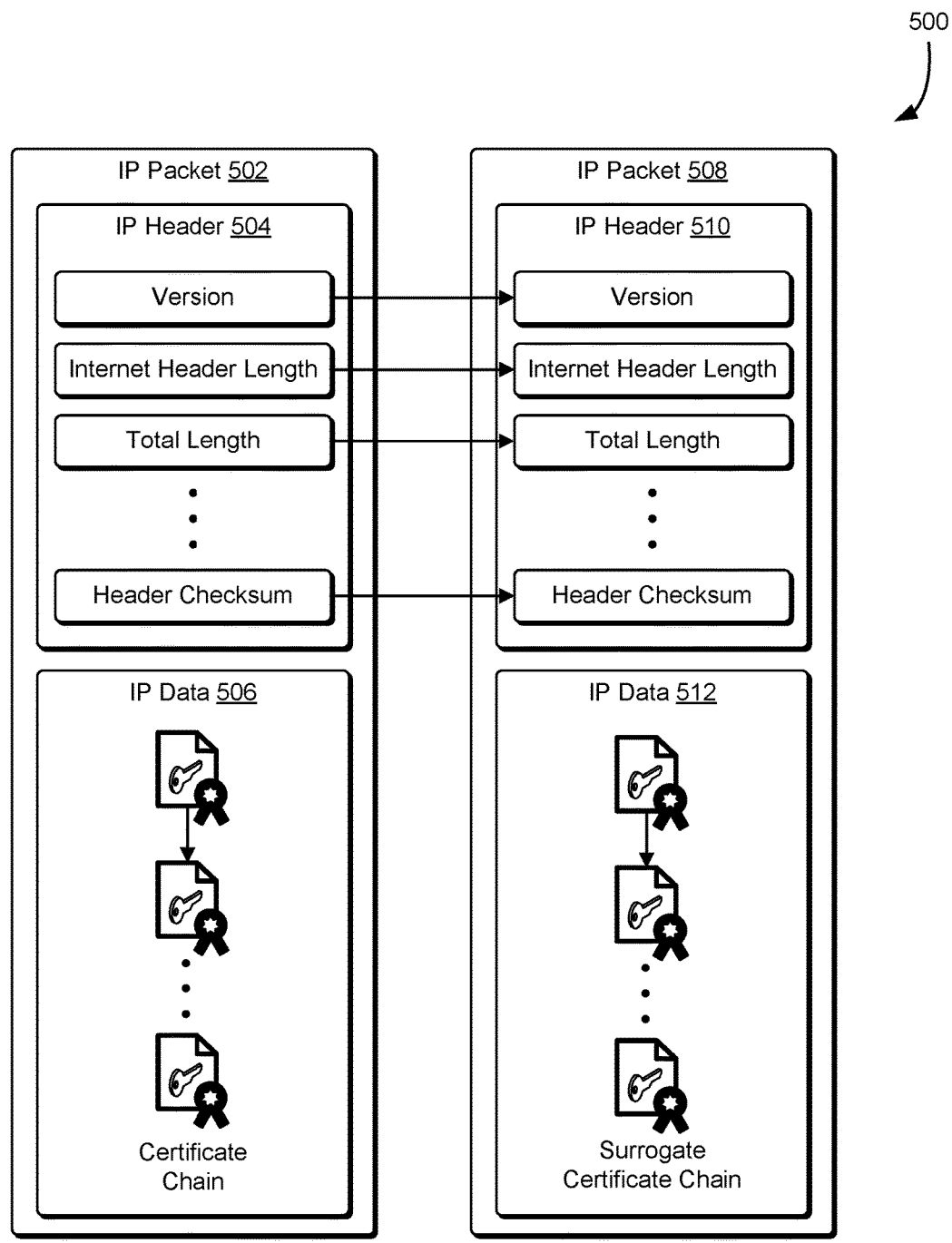
FIG. 5 shows an illustrative example of a data packet in accordance with various embodiments.

FIG. 5 shows a diagram 500 of data packets with certificate chains that may be transmitted and received. In some embodiments, the first IP packet 502 may be transmitted by a computing system (e.g., a server discussed above in connection with FIG. 1) and received by a network security device. The network security device may receive the first IP packet 502 that includes an IP header 504 section and an IP data 506 section. The IP header 504 section may include information regarding the IP version, the internet header length, and the total length. The version may refer to the version of the IP packet (e.g., IPv4). The internet header length may refer to the length of the IP header 504, which may be variable length. The total length may refer to the length of the entire IP packet, which may include a header and data portion. In various embodiments, a data packet may, generally, include one or more length fields that indicate the length of a data packet or a subsection of the data packet. The lengths and sizes may be expressed in various units of measurements, including but not limited to measurements in bits, bytes, words, dwords (double words), and more. While the data packets shown in FIG. 5 are Internet Protocol (IP) packets, the data packets may be in accordance to various protocols and standards such as Internet Protocol Version 4 (IPv4), Internet Protocol Version 6 (IPv6), and the Hypertext Transfer Protocol (HTTP).

The second IP packet 508 may include an IP header 510 section and an IP data 512 section that includes a surrogate certificate chain. A network security device may generate a surrogate certificate chain and provide the surrogate certificate chain to a computer system (e.g., a client described above in connection with FIG. 1). The second IP packet 508 may be generated at least in part by a network security device upon receiving the first IP packet 502. In some embodiments, the network security device may generate the second IP packet 508 by receiving the first IP packet 502 and replacing the IP data section of the first packet (e.g., the certificate chain) with other data (e.g., the surrogate certificate chain) so as to form the second IP packet 508 which may be transmitted. In some embodiments, such as those where the certificate chain and the surrogate certificate chain are of the same size, the IP header 510 of the second IP packet may have the same internet header length, total length, and various other fields indicating the size of the IP packet or a subsection of the IP packet. Likewise, the first IP header 504 and the second IP header 510 may both include the same checksum value. In some embodiments, the first IP header 502 and the second IP header 510 may be identical (i.e., all fields of the first and second IP header have the same respective values), excluding the source and destination information. In some embodiments, one or more fields of the header may be different—for example, in some embodiments, a header may include a checksum field that is based at least in part on the value of the data section. As the certificate information of the certificate chain and the surrogate certificate chain may be different, the checksum of the second packet may be recomputed so as to ensure validity of the second packet.

More generally, a first protocol data unit (PDU) having header data and/or metadata may be received by a data networking device in connection with the transmission of a certificate and/or certificate chain. A second PDU having the same header and/or metadata may be transmitted by the data networking device in connection with a surrogate certificate or surrogate certificate chain derived at least in part from the certificate chain. In some embodiments, the size of the server certificate chain and the size of the surrogate certificate chain may be different—for example, if a surrogate certificate chain is smaller than the certificate chain, a padding structure may be included as part of the IP data 512 of the second data packet so as to make the size of the first IP packet 502 and the second IP packet 508 match. A protocol data unit may refer to a unit with which information may be transmitted, examples of which include packets, frames, segments, datagrams, and bit streams.

While an IP packet is shown in FIG. 5 to illustrate matching packet sizes used in the transmission of a certificate chain and a surrogate certificate chain, variations on the embodiment may exist. For example, the data packet may be an IP packet in accordance with the Internet Protocol version 4 (IPv4) or Internet Protocol version 6 (IPv6). The data packet may be in accordance with protocols at various layers of the Open Systems Interconnection (OSI) model, both including layers above and below the layer that may be used to establish a cryptographically protected communication session using the included certificates. For example, a data packet in accordance with FIG. 5 may be implemented in accordance with the Hypertext Transfer Protocol (HTTP) where a data packet may correspond to an HTTP message body where the header section corresponds to metadata regarding the message body (e.g., the content length) and the data section corresponds to the message body data, which may be used to transmit certificates and/or certificate chains. As another example, the data packet in accordance with FIG. 5 may be implemented as a Transmission Control Protocol (TCP) segment having a segment header section and a data section. As yet another example, the data packet in accordance with FIG. 5 may be implemented as a User Datagram Protocol (UDP) datagram having a UDP header and UDP data. A data packet in accordance with FIG. 5 may also be implemented as an Ethernet frame having metadata section (e.g., header and frame check sections) and payload section.

It should be noted that while FIG. 5 illustrates an entire certificate chain being transmitted in each data packet, that in various embodiments, the data packets may each include only part of a chain (e.g., certificate or part of a certificate) and that multiple data packets including multiple portions of a certificate chain may be transmitted and re-assembled at a destination.

In some embodiments, a digital certificate may be fragmented and transmitted in more than one packet. In such embodiments, a plurality of data packets may be received, each having a portion of the certificate. A system may generate a surrogate certificate based on the received certificate (or even a portion of the received certificate) and generate, for each packet in the received plurality of data packets, a corresponding packet of a second plurality of data packets that encapsulates the generated surrogate certificate. Each packet of the second plurality of data packets may have header information (such as a length field) that matches the header information of the corresponding received packet of the first plurality. The total length (e.g., size in bytes) of the packets of the second plurality may be configured to equal the total length of the packets received in connection with the certificate. In some cases, each packet generated for the surrogate certificate may be generated with a size that matches the size of a corresponding received packet. As an example, consider the case where a certificate is fragmented such that a first subset of fields are transmitted in a first data packet and a second subset of different fields are transmitted in a second data packet. In some embodiments, the two packets are received by a system, the certificate is reassembled, a surrogate certificate is generated, and a third data packet is created having the same fields as the first data packet and a fourth data packet is created having the same fields as the second data packet. The third and fourth data packets may be of the same size (e.g., in bytes) as the first and second data packets, respectively. Note that while the fields of the data packets may match, that their values may be different (e.g., source and destination information may differ).

Figure 6:
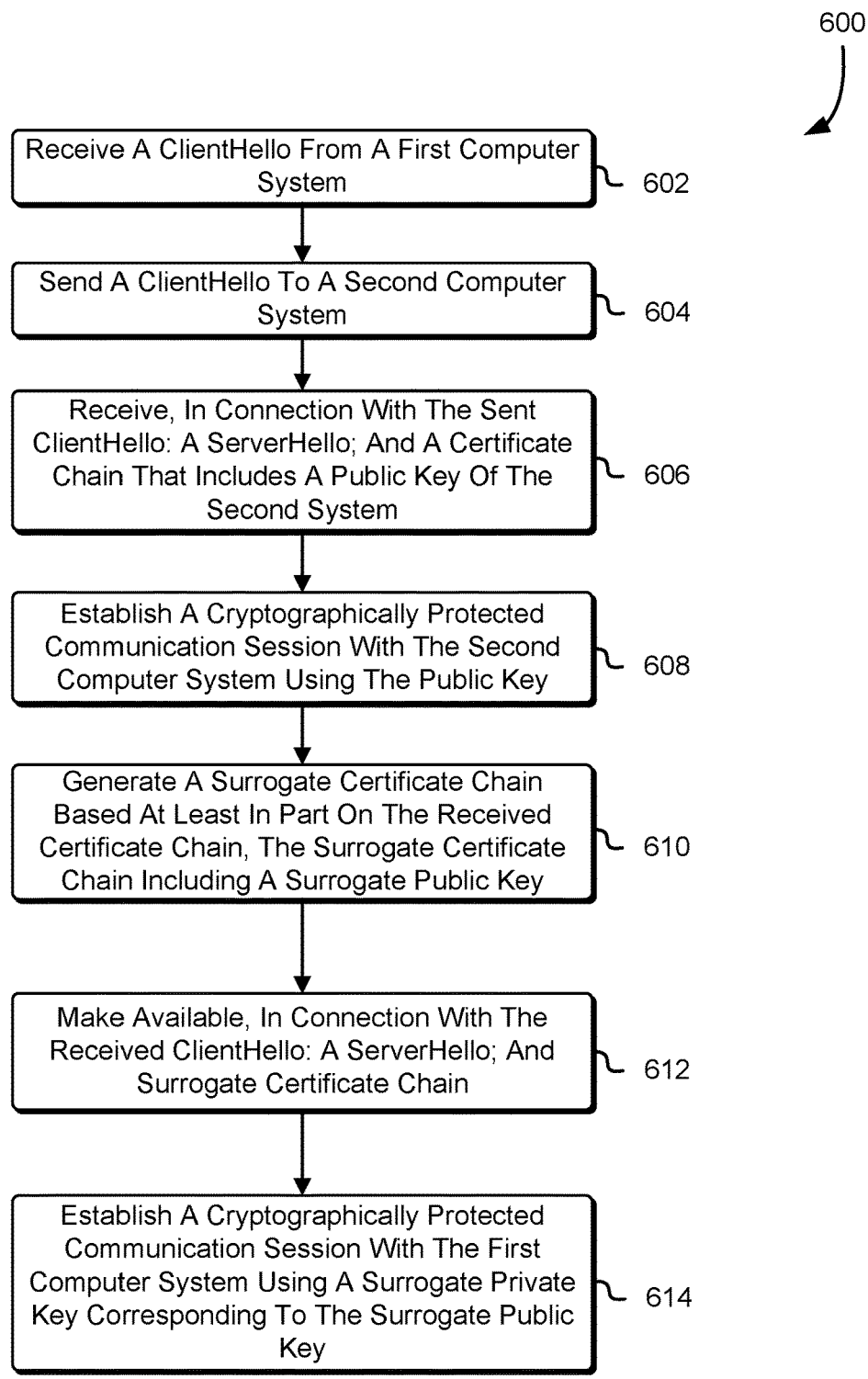
FIG. 6 shows a diagram illustrating a process for establishing a cryptographically protected communication session.

FIG. 6 shows a diagram illustrating a process 600 for establishing a cryptographically protected communication session using a surrogate certificate. The process may be performed by any suitable system, such as the network security device described above in connection with FIG. 1. The process may be performed, for example, when a computer system within an organization's intranet attempts to establish a TLS session with an external system (e.g., another computer system that is outside of the organization's intranet).

A system may receive 602 a ClientHello from a first computer system. The ClientHello may be made as part of a TLS handshake protocol and the intended recipient may be a second computer system. The system receiving the ClientHello may be a network security device or router that is part of a network path between the first computer system and the second computer system. The system may send 604 a ClientHello to the second computer system via an external network such as the Internet. In some embodiments, the system receives 606, in connection with the sent ClientHello (e.g., the ClientHello sent to the second computer system) a response that includes a ServerHello, a certificate chain, and a ServerHelloDone. The certificate chain may have chain of trust that is cryptographically verifiable by the system, and the end-entity certificate of the certificate chain may include a certificate that includes a public key associated with the second computer system. The system may establish 608 a cryptographically protected communication session (e.g., TLS session) with the second computer system using the public key. The public key may be used as part of a handshake protocol to negotiate a shared secret between the system performing the process 600 and the second computer system. It should be noted that the certificate chain may be received using various protocols and may be encapsulated in various logical structures at various levels of abstraction. For example, the certificate chain may be received at least in part in one or more IP packets. The certificate chain may also be received (either in the same embodiment as described in the previous sentence or in a different embodiment) at least in part in an HTTP message body.

In some embodiments, the system generates 610 a surrogate certificate chain based at least in part on the received certificate chain. The system may furthermore have access to a private key corresponding to the public key of the end-entity certificate of the surrogate certificate chain. In some embodiments, the system may use a cryptography service to generate one or more certificates of the surrogate certificate chain and/or access a certificate cache to obtain one or more surrogate certificates. Surrogate certificates may have a chain of trust to a trusted surrogate root certificate which acts as a trust anchor and is issued within an organization. A surrogate certificate may be trusted by the first computer system (e.g., the first computer system may be provisioned by a system administrator to include a surrogate root certificate as a trusted certificate). In some embodiments, the surrogate certificate chain may be of the same length (i.e., the chains have the same number of certificates) and/or the same size (e.g., in bytes) as the received certificate chain. The generation of a surrogate certificate chain may be performed in accordance to the process described below in connection with FIG. 7.

The system may make available 612, for example, to the second computer system, a ServerHello, the surrogate certificate chain, and a ServerHelloDone, for example in accordance with a TLS handshake protocol. The system may establish a cryptographically protected communication session with the first computer system using the private key corresponding to the public key of the end-entity certificate. Data may be made available to a computing entity in various ways—for example, data may be made available to a computing entity by transmitting the requested data in one or more messages, or may be made available by storing the data in a data repository (e.g., a network storage device) that a computing entity has access to and providing the computing entity with information such as a token, Uniform Resource Identifier (URI), Uniform Resource Locator (URL) and the like which may be used to indicate where and/or how to obtain the resource from the data repository.

In some embodiments, the second cryptographically protected communication session is established using configuration data that matches that of the first cryptographically protected communication session. However, in some embodiments, different types of sessions may be used. For example, an organization may support a first set of cipher suites to be used in communications within an internal network such that the cryptographically protected communication session between the system and the first computer system, which may entirely within an internal network, uses a cipher suite selected from the first set of cipher suites. Continuing with the example, the organization may support a second set of cipher suites for communications between the system and the second computer system which may be outside of the organization's internal network. The cryptographically protected communication session between the system and the second computer system may use a different cipher suite selected from the second set of cipher suites. In some embodiments, the system may detect that the first computer is attempting to connect to the second computer system using a configuration that is appropriate for internal communications (e.g., communications within the organization's intranet) and may use the configuration for establishing the communication session with the first computer system and also select a different configuration that is appropriate for external communications (e.g., communications over the Internet) to establish the communication session with the second computer system. In some cases, the system, which may be a network security device, may receive a ClientHello from the first computer system intended for the second computer system using a first cipher suite and upgrade the connection by using a second, stronger cipher suite to establish the cryptographically protected communication session between the system and the second computer system. In some cases, the system may detect that the cipher suite that a first computer system negotiates with the second computer system is not supported by the second computer system and may downgrade the connection between the system and the second computer system (e.g., by using a different, weaker, cipher suite to establish the cryptographically protected communication session between a network security device and a server) but use a stronger cipher suite for the connection between the system and the first computer system.

Figure 7:
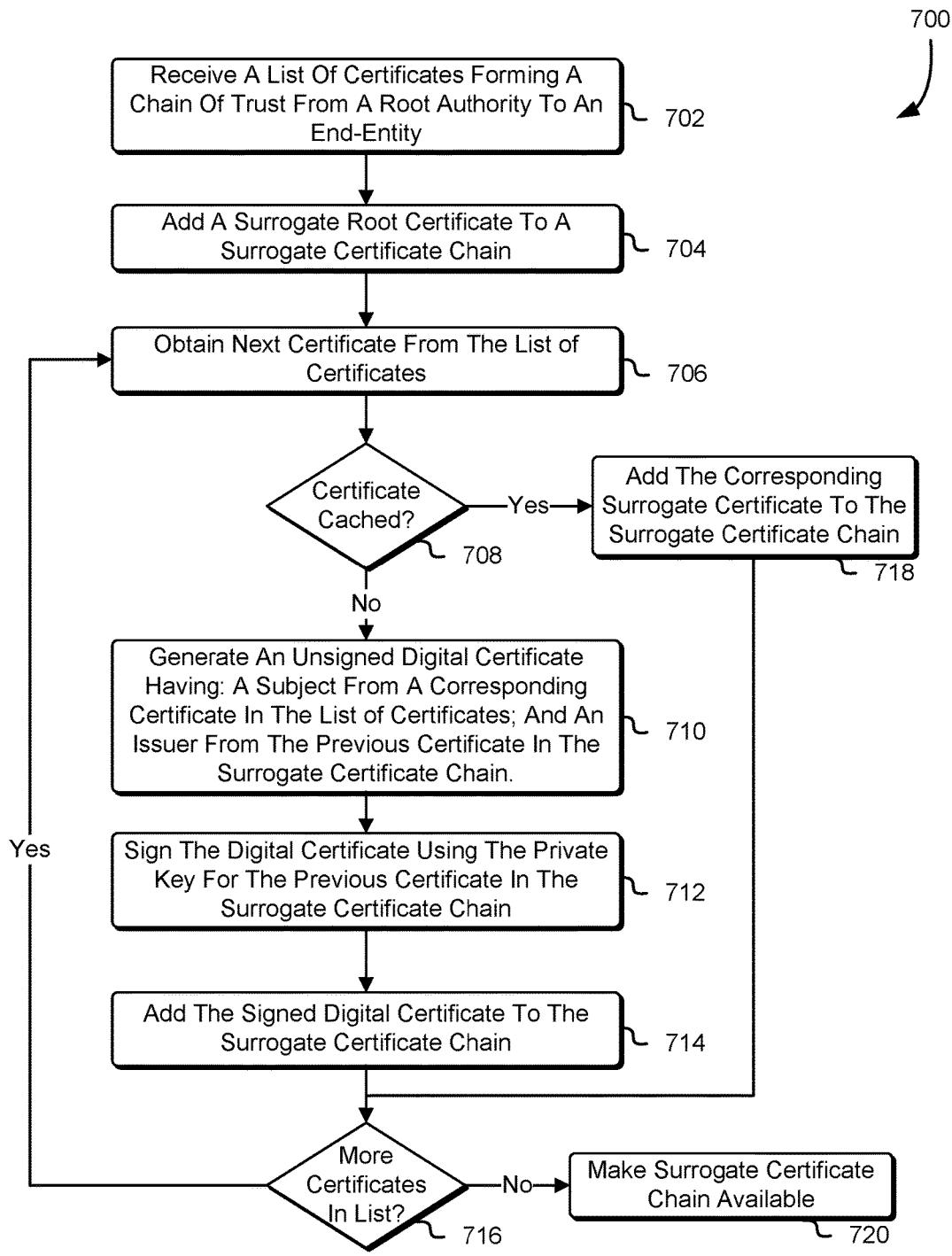
FIG. 7 shows a diagram illustrating a process for generating a surrogate certificate chain.

FIG. 7 shows a diagram illustrating a process 700 for generating a surrogate certificate chain. The process may be performed by any suitable system, such as the network security device described above in connection with FIG. 1. In some embodiments, the process 700 may be performed by a cryptography service that the network security device may communicate with via an application programming interface. The process 700 may be performed in conjunction with the handshake process described above in connection with FIG. 6. The system may receive 702 a list of certificates forming a chain of trust from a root authority to an end-entity. The certificate chain may include two or more digital certificates.

The system may generate obtain a surrogate root certificate and add 704 the surrogate root certificate to a surrogate certificate chain. The surrogate root certificate may be the first certificate in the certificate chain and may be a trusted root certificate. The root certificate may be issued by an organization and trusted by computing devices within the organization. The system may obtain 706 a certificate from the received list of certificates. In some embodiments, the first certificate after the root certificate of the received certificate chain is obtained. The system may check 708 whether a surrogate certificate corresponding to the obtained certificate is accessible via a certificate cache such as the certificate cache described in connection with FIG. 1. The certificate cache may have a mapping of certificates to surrogate certificates that may be used to determine whether a particular certificate obtained from the received certificate chain has been cached. If the check determines that the certificate is cached, the corresponding surrogate certificate is obtained and added 718 to the surrogate certificate chain. However, if the certificate is not found in the cache, then a surrogate certificate corresponding to the certificate may be generated. In some embodiments, a certificate cache may not be utilized by the system and the system may bypass the check 708 and perform steps in connection with the generation of a surrogate certificate.

A surrogate certificate may be derived from the obtained certificate by first generating 710 an unsigned digital certificate that includes a subject field derived from the obtained certificate's subject field and an issuer that corresponds to the entity associated with the preceding certificate in the surrogate certificate chain (e.g., in this example, the surrogate root authority). In some embodiments, additional fields are derived from the obtained certificate, such as the cryptographic key type and key size. Subsequently, the system may digitally sign 712 the digital certificate using the private key associated with the previous certificate in the surrogate certificate chain (e.g., in this case, the private key corresponding to the public key included in the surrogate root certificate). A cryptography service may be used to perform some or all of the cryptographic operations described in connection with the generation of surrogate certificates.

The signed surrogate certificate may be added 714 to the surrogate certificate chain, which may be logically represented using various data structures, such as a linked list of certificate chains, an array of certificates, stack data structure, and the like. The system may check 716 whether more certificates are in the list of obtained certificates. If there are more certificates, the system may obtain the next certificate from the list of certificates and either obtain a corresponding surrogate certificate from a certificate cache or generate the corresponding surrogate certificate. The surrogate certificate may iteratively perform this process until it determines that there are no more certificates in the list, and then make 720 the surrogate certificate chain available, for example, in connection with embodiments described above in connection with FIGS. 1-6 above.

Figure 8:
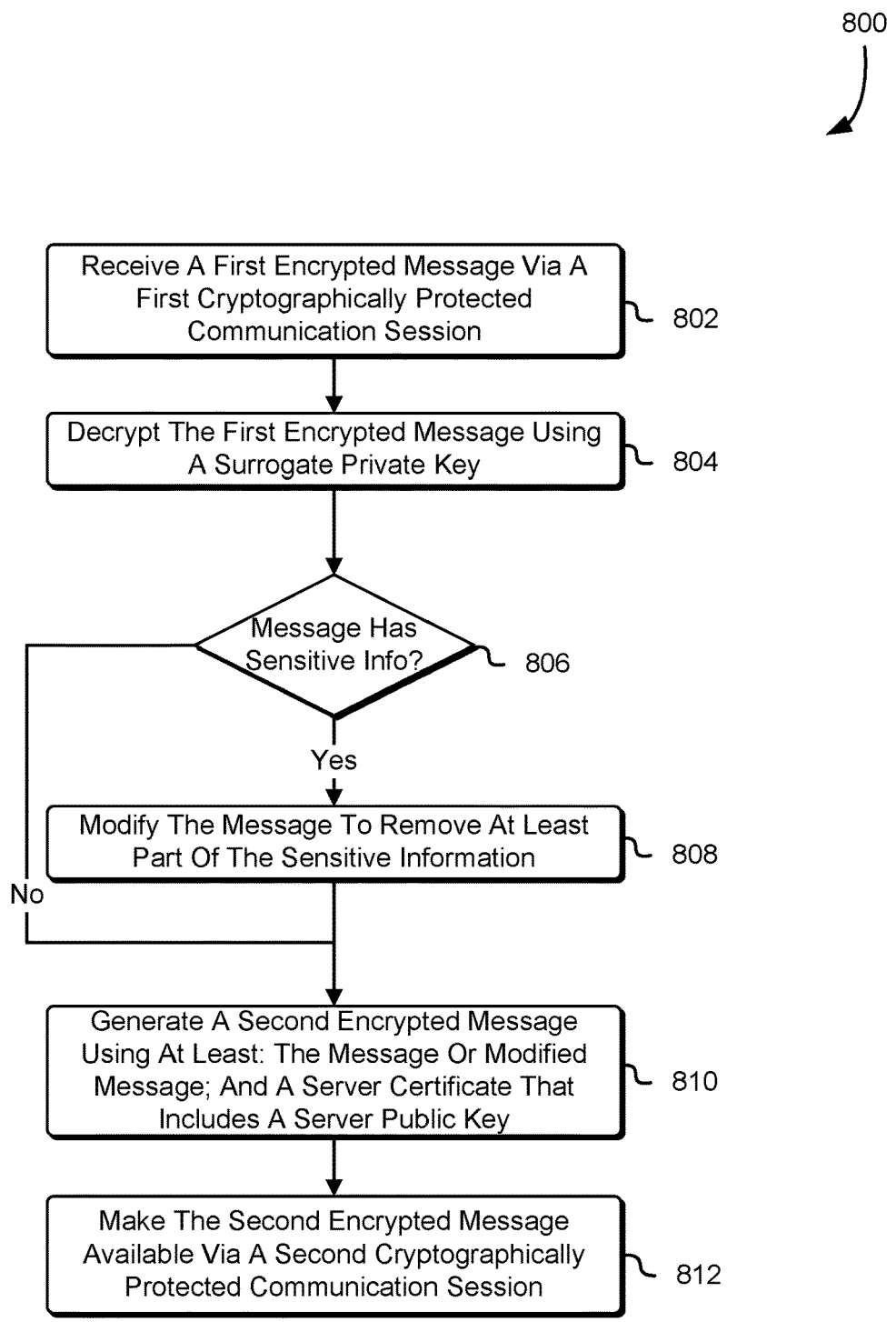
FIG. 8 shows a diagram illustrating a process for monitoring and protecting sensitive data over a network.

FIG. 8 shows a diagram illustrating a process 800 for monitoring network traffic using surrogate certificates. The process may be performed by any suitable system, such as the network security device described above in connection with FIG. 1. The system may receive 802 a first encrypted message via a first cryptographically protected communication session. The session may be a TLS session that was established between a first computer system and the network security device within an internal network. The cryptographically protected communication session may be established in accordance with the process described above in connection with FIG. 6.

The system may decrypt 804 the first encrypted message using a surrogate private key. In some embodiments, the surrogate public key may be included in a surrogate end-entity certificate of a surrogate certificate chain that is provided to a computer system as part of a handshake protocol. The computer system may have performed an encryption operation over the message using the surrogate public key to generate the first encrypted message. In some embodiments, the system may decrypt the first encrypted message using a cryptographic key that was obtained at least in part using the surrogate private key. For example, as part of a TLS handshake protocol, the system my receive an encrypted secret and decrypt the encrypted secret using the surrogate private key. The secret may be used to determine a symmetric key that may be used to decrypt the first encrypted message.

The system may then check 806 whether the decrypted first message includes sensitive information. Sensitive information may refer to information that should not be transmitted outside of the company's intranet. For example, sensitive information may include an organization's trade secrets, social security numbers of employees or customers, credit card numbers, and more. If the system determines that sensitive information is included in the message, the system may modify 808 the message to remove at least part of the sensitive information. For example, a system may be configured to partially modify the following types of sensitive information: social security numbers (obfuscating the first 5 digits, but allowing the last 4 digits to be transmitted); credit card numbers (obfuscating all but the last 4 digits of the credit card number); and email addresses (obfuscating all but the first two letters of the address and the domain name). More generally, the system may identify a first section of the sensitive information to modify and identify a second section of the sensitive information that may be preserved (i.e., not modified). The preserved section of the sensitive information may be transmitted to a recipient (e.g., the server described in connection with FIG. 1). In some embodiments, the sensitive information may be entirely removed (e.g., a password may be completely obfuscated by replacing a password with a predetermined fixed number of asterisk characters).

If the message was modified, the system may generate 810 a second encrypted message over the modified message using a public key associated with a computing system that is to receive the message. In an example, the public key is obtained from a digital certificate associated with the entity to receive the message. In some embodiments, the system may encrypt the modified message using a second symmetric key that was obtained during a handshake process between the system and the entity to receive the message, in a manner similar to that described above in connection with the decryption step 804. If the message was not modified, the system may generate 810 the second encrypted message by performing the encryption steps just described, but using the unmodified message as the input to the encryption operation.

The system may then make 812 the second encrypted message available, for example, via a second cryptographically protected communication session (e.g., TLS session) to a recipient computing system. In some embodiments, if the system detects that sensitive information was included in the original message, the system may, instead of generating a modified message, refuse to deliver the message to the recipient computer system. Refusal to deliver the message to the recipient computer system may be accomplished in various ways, such as by simply receiving the message (e.g., in the manner described above in step 802) and not transmit the message or modified message to the recipient computer system. In some embodiments, the system may further send, to the computing entity that transmitted the message in step 802, an indication that the system failed to deliver the message to the recipient. In some embodiments, such as those where the message is being transmitted to the recipient computer system in response to a request, the system may provide, to the recipient computer system, an indication of a failure to fulfill the request, such as an indication of a timeout or an error code.

Figure 9:
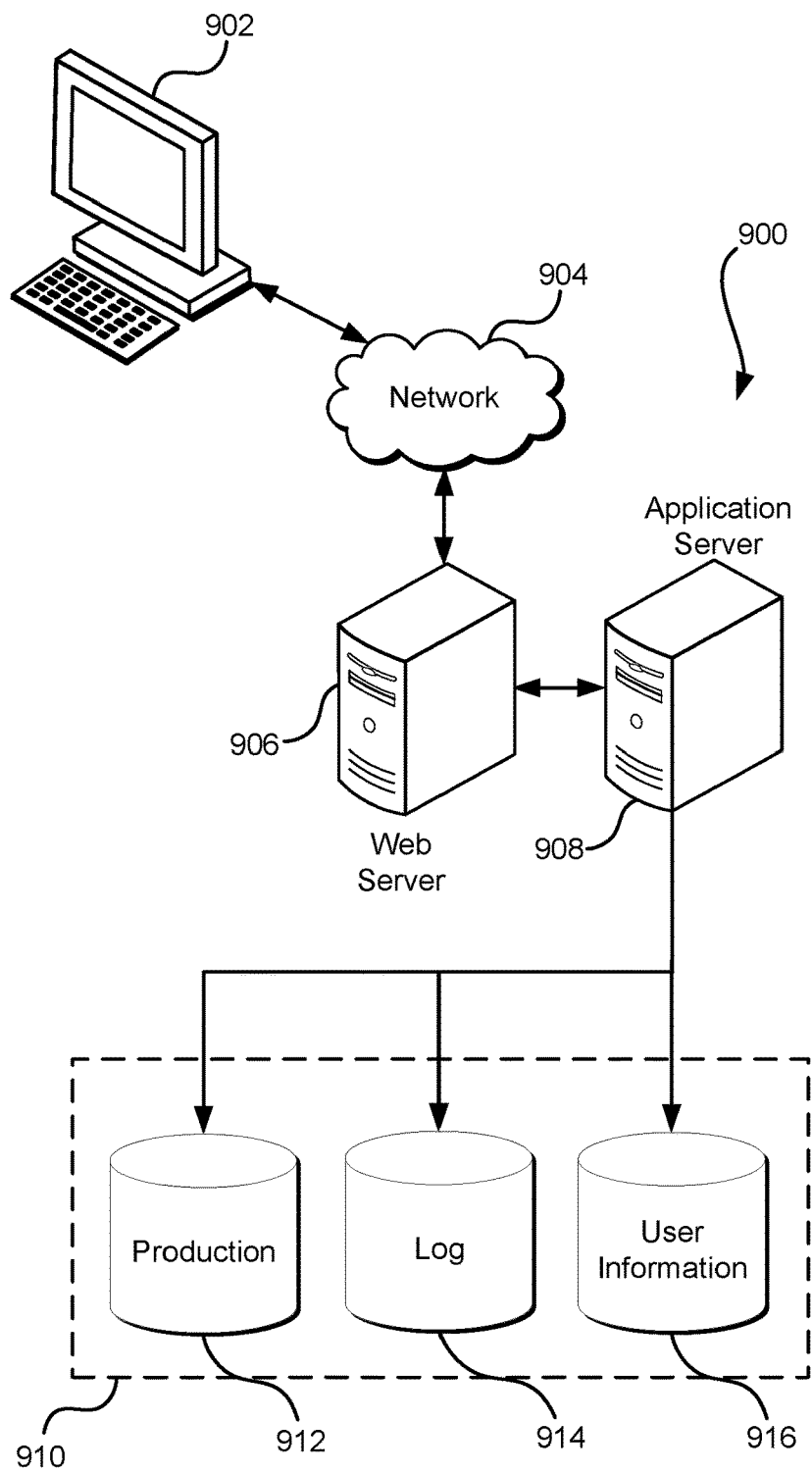
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a computer system that includes a processor; and
   memory containing executable instructions that, as a result of execution by the processor, cause the system to:
   receive a certificate chain transmitted from a server to a client, the certificate chain comprising:
      an intermediate certificate comprising an intermediate authority public key and intermediate subject information, wherein validity of the intermediate certificate is cryptographically verifiable based at least in part on a first chain of trust between the intermediate certificate and a trusted root certificate; and
      an end-entity certificate comprising an end-entity public key, wherein validity of the end-entity certificate is cryptographically verifiable based at least in part on the intermediate authority public key;
   generate a surrogate certificate chain by:
      obtaining a surrogate intermediate certificate comprising a surrogate intermediate authority public key and subject information associated with the intermediate subject information, wherein validity of the surrogate intermediate certificate is cryptographically verifiable based at least in part on a second chain of trust between the surrogate intermediate certificate and a trusted surrogate root certificate; and
      obtaining a surrogate end-entity certificate comprising a surrogate end-entity public key and subject information associated with end-entity subject information of the surrogate end-entity certificate, wherein the surrogate end-entity certificate is digitally signed using a surrogate intermediate authority private key corresponding to the surrogate intermediate authority public key; and
   transmit the surrogate certificate chain to the client as a replacement for the certificate chain.

2. The system of claim 1, wherein:
   the computer system establishes a first cryptographically protected communication session with the server using at least the end-entity certificate and the certificate chain; and
   the computer system establishes a second cryptographically protected communication session with the client using at least the surrogate certificate chain and a surrogate end-entity private key corresponding to the surrogate end-entity public key.

3. The system of claim 2, wherein the memory containing executable instructions further includes executable instructions that, as a result of execution by the processor, cause the system to:
   receive an encrypted message via the second cryptographically protected communication session;
   decrypt the encrypted message to generate a decrypted message;
   detect, based at least in part on the decrypted message, satisfaction of a condition indicating the server should not receive the decrypted message;
   modify the decrypted message to generate a modified message such that the condition is no longer satisfied;
   encrypt the modified message using the end-entity public key to generate an encrypted modified message; and
   transmit the encrypted modified message via the second cryptographically protected communication session.

4. The system of claim 1, wherein the certificate chain and the surrogate certificate chain are of a same length.

5. A computer-implemented method, comprising:
   obtaining an intermediate authority certificate, the intermediate authority certificate comprising an intermediate authority public key;
   generating a surrogate end-entity certificate, the surrogate end-entity certificate comprising:
   a surrogate end-entity public key;
   subject information associated with an end-entity certificate;
   issuer information associated with the end-entity certificate; and
   wherein validity of the surrogate end-entity certificate is cryptographically verifiable based at least in part on the intermediate authority public key; and
   making at least the surrogate end-entity certificate available to replace the end-entity certificate.

6. The computer-implemented method of claim 5, wherein validity of the intermediate authority certificate is cryptographically verifiable via a chain of trust that includes a first trusted root authority, the first trusted root authority being different from a second trusted root authority usable to determine validity of the end-entity certificate.

7. The computer-implemented method of claim 5, wherein a size of the end-entity certificate and a size of the surrogate end-entity certificate are equal.

8. The computer-implemented method of claim 5, wherein:

the end-entity certificate is obtained via a first data packet, the first data packet comprising a protocol type and a packet size; and the surrogate end-entity certificate is made available via a second data packet, the second data packet comprising the protocol type and the packet size.

9. The computer-implemented method of claim 8, wherein the protocol type is selected from the group consisting of: internet protocol (IP); transport layer security (TLS); transmission control protocol (TCP); and user datagram protocol (UDP).

10. The computer-implemented method of claim 8, wherein:

the end-entity certificate is of a larger size than the surrogate end-entity certificate; and the second data packet further comprises a data portion of the second data packet the data portion comprising the surrogate end-entity certificate and a padding structure.

11. The computer-implemented method of claim 8, wherein:

the end-entity certificate comprises an end-entity public key;

the end-entity public key is of a larger size than the surrogate end-entity public key; and the surrogate end-entity certificate further comprises a padding structure.

12. The computer-implemented method of claim 8, wherein:

the end-entity certificate comprises an end-entity public key and one or more extension fields;

the end-entity public key is of a smaller size than the surrogate end-entity public key; and obtaining the subject information from the end-entity certificate includes omitting at least a portion of the one or more extension fields.

13. A non-transitory computer-readable storage medium storing executable instructions that, as a result of being executed by one or more processors of a computer system, cause the computer system to at least:

generate a first plurality of digital certificates, the first plurality of digital certificates comprising a first digital certificate and a second digital certificate, wherein:

individual digital certificates of the first plurality of digital certificates are associated with at least one corresponding digital certificate of a second plurality of digital certificates; and the second digital certificate comprises a first public key and issuer information obtained from an associated digital certificate of the second plurality of digital certificates, the associated digital certificate comprising a second public key different from the first public key; and provide the first plurality of digital certificates in place of the second plurality of digital certificates as part of an authentication process.

14. The non-transitory computer-readable storage medium of claim 13, wherein the first plurality of digital certificates are generated by at least:

determining a cached digital certificate associated with a certificate of the second plurality of digital certificates is stored;

obtaining the cached digital certificate; and adding the cached digital certificate to the first plurality of digital certificates.

15. The non-transitory computer-readable storage medium of claim 13, wherein:

a first chain of trust is cryptographically verifiable from the first digital certificate to the second digital certificate based at least in part on the first plurality of digital certificates; and a second chain of trust is cryptographically verifiable from the associated digital certificate to a root certificate based at least in part on the second plurality of digital certificates.

16. The non-transitory computer-readable storage medium of claim 13, wherein first public key is in accordance with a first public key algorithm and the second public key is in accordance with a second public key algorithm that is different from the first public key algorithm.

17. The non-transitory computer-readable storage medium of claim 13, wherein the first public key is generated to have a size equal to the size of the second public key.

18. The non-transitory computer-readable storage medium of claim 13, wherein the executable instructions further cause the computer system to:

establish a first cryptographically protected communication session with a first computing entity using the first public key;

establish a second cryptographically protected communication session with a second computing entity using the second public key;

receive an encrypted message via the second cryptographically protected communication session from the second computing entity;

decrypt the encrypted message to generate a message;

modify the message so as to remove sensitive information; and transmit an encrypted modified message via the first cryptographically protected communication session to the first computing entity.

19. The non-transitory computer-readable storage medium of claim 18, wherein the first cryptographically protected communication session utilizes a first cipher suite and the second cryptographically protected communication session utilizes a second cipher suite that is different from the first cipher suite.

20. The non-transitory computer-readable storage medium of claim 18, wherein modifying the message includes identifying a first section of the sensitive information to modify and identifying a second section of the sensitive information to preserve.

* * * * *